United States Patent [19]
Youngquist

[11] Patent Number: 5,654,906
[45] Date of Patent: Aug. 5, 1997

[54] RATE GYRO ERROR CORRECTION AND USE AS HEADING SOURCE

[76] Inventor: John S. Youngquist, 899 Niagara Blvd., Fort Erie, Ontario, Canada, L2A 5M4

[21] Appl. No.: 498,882

[22] Filed: Jul. 6, 1995

[51] Int. Cl.$^6$ .................................................. G06F 7/70
[52] U.S. Cl. ......................... 364/571.01; 364/424.06
[58] Field of Search ................... 364/571.01, 424.06, 364/433–435, 457; 244/75 R, 76 R, 177–182, 184

[56] References Cited

U.S. PATENT DOCUMENTS

| | | | |
|---|---|---|---|
| 3,809,867 | 5/1974 | Hattendorf | 244/77 B |
| 3,901,120 | 8/1975 | Youngquist. | |
| 3,946,968 | 3/1976 | Stallard | 244/3.21 |
| 4,006,870 | 2/1977 | Boone et al. | 244/184 |
| 4,067,517 | 1/1978 | Barnum | 244/17.13 |
| 4,094,479 | 6/1978 | Kennedy, Jr. | 244/179 |
| 4,103,848 | 8/1978 | Johnson, Jr. et al. | 244/17.13 |
| 4,212,443 | 7/1980 | Duncan et al. | 244/177 |
| 4,343,035 | 8/1982 | Tanner | 244/175 |

OTHER PUBLICATIONS

Nakamura, "Piezoelectric Free–Free–Bar Vibration Gyroscope", Murata Mfg. Co., Ltd., Kyoto, Japan date unknown.
Silicon Designs, Inc., Capacitive Accelerometer Model 1010 May 27, 1994.
GYROSTAR™, Piezoelectric Vibrating Gyroscope (ENX–0011) available from Murata Mfg. Co., Ltd. date unknown.

*Primary Examiner*—James P. Trammell
*Attorney, Agent, or Firm*—Nixon & Vanderhye P.C.

[57] ABSTRACT

A simple accelerometer economically corrects the output of a yaw rate transducer for (a) vibration-induced noise and (b) aircraft bank angle (e.g., by using the accelerometer to measure apparent gravity forces which are a function of aircraft bank angle) to create a heading source. The exemplary embodiment utilizes a programmed digital signal processor in conjunction with suitable transducers and may be installed in an aircraft for measuring heading changes of banked and turning aircraft in flight (typically used by aircraft navigation and/or whether display apparatus). A long-running (e.g., continuous) integrator is used in a current balance circuit to provide enhanced measurement precision. Severely limited dynamic range of periodic heading change update signals for use in generating an error-compensation signal greatly reduces the influence of turbulence-induced errors and acts to continually increase the rate of convergence to true aircraft heading change outputs. Transducer offset measure and compensation is preferably operated at a first relatively high aggressive rate at instrument turn-on conditions when the aircraft is assumed to be stationary and then at a slower less aggressive rate thereafter.

58 Claims, 3 Drawing Sheets

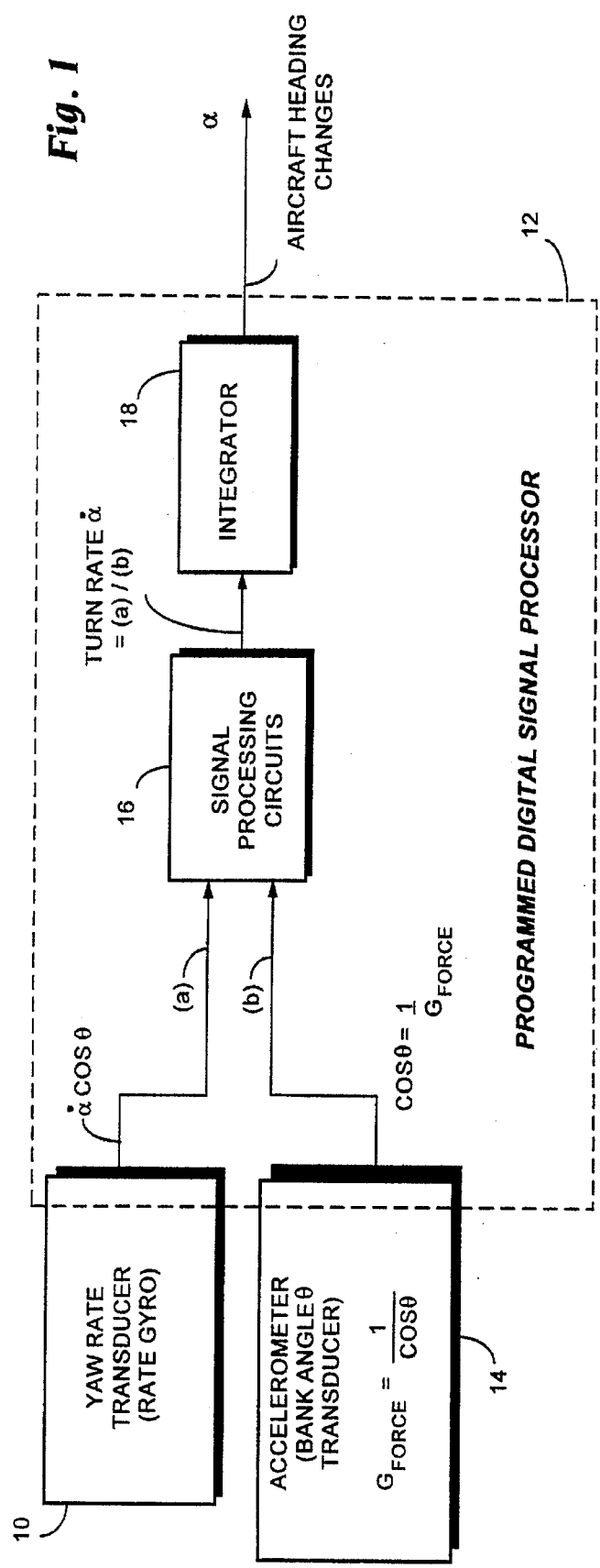
Fig. 1
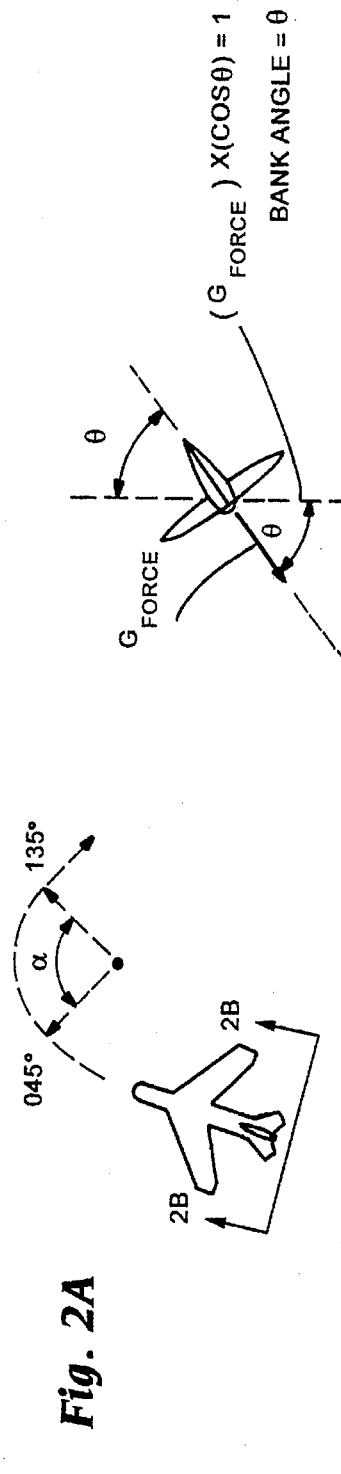
Fig. 2A
Fig. 2B

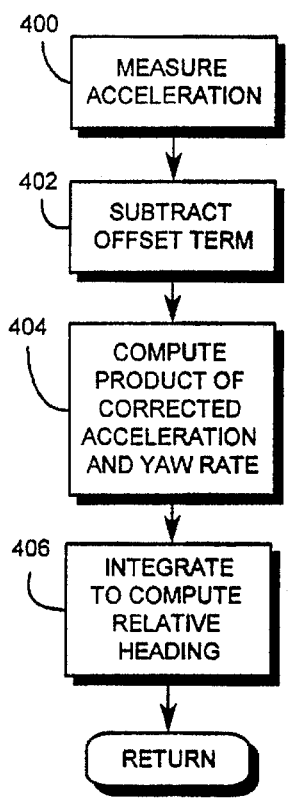
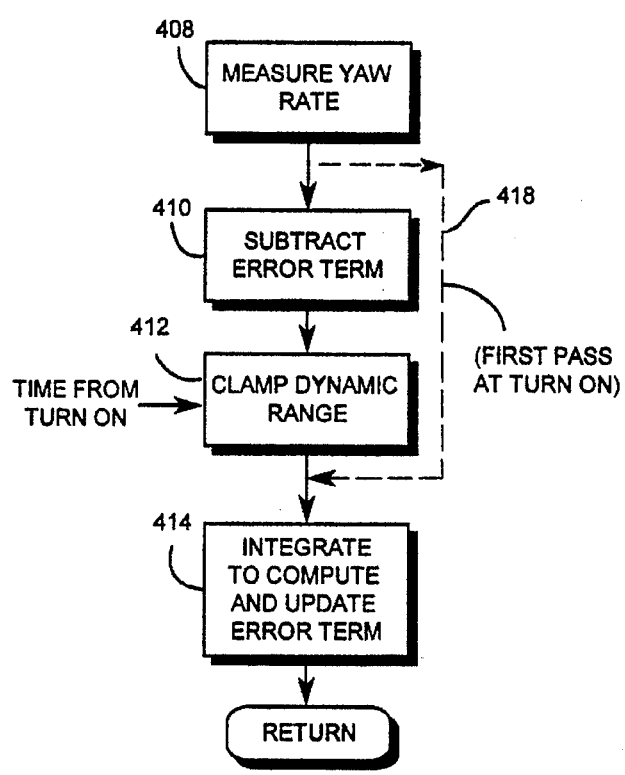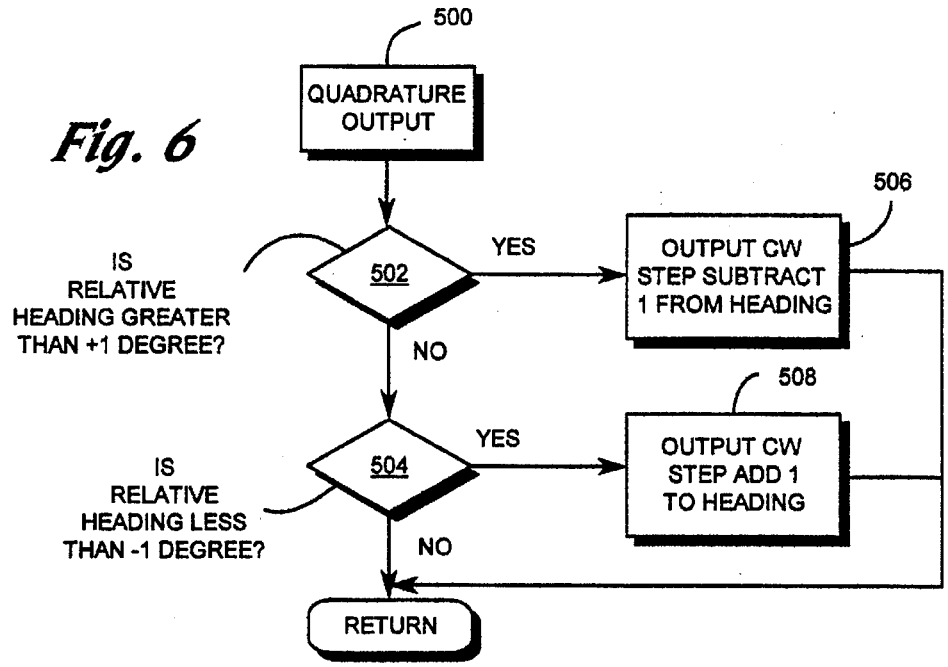

RATE GYRO ERROR CORRECTION AND USE AS HEADING SOURCE

BACKGROUND OF THE INVENTION

1. Field of the Invention

This invention generally relates to method and apparatus for correcting errors in the output of a rate gyro and is especially useful for measuring the heading changes of a turning vehicle (e.g., a banked and turning aircraft in flight). The invention provides a relatively simple and economical heading reference signal source for use in vehicles (e.g., aircraft).

The invention is particularly suited for use with a StrikeFinder™ storm monitoring system by Insight Instrument Corporation (e.g., see U.S. Pat. No. 5,245,274 hereby incorporated by reference) so as to provide aircraft heading data to permit the displayed lightning strikes to be correctly oriented on the display with respect to the current instantaneous aircraft heading.

2. Description of the Prior Art

Aircraft heading reference systems typically utilize a spinning gyroscope mass for an inertial reference. Such a "gyro-compass" is in common usage despite its relatively large size, high cost, poor long-term reliability and routine required maintenance. For some applications, such complicated and expensive devices are effectively impractical.

A type of gyroscope called a "rate gyro" is also available in many forms. Some rate gyros utilize a traditional spinning wheel (and thus may be subject to the same impracticalities as traditional gyro-compass explained above) while others may use a simple stream of air, a tuning fork, a taunt wire or the like for an inertial reference. In its most common form, a rate gyro typically senses the rate of rotation around a predetermined axis and delivers a voltage or resistance change functionally related in a predetermined way to the turn rate (i.e., the first order derivative of the turn angle taken with respect to time) of the vehicle to which the rate gyro is attached.

Piezoelectric vibrating gyroscopes are among the known types of rate gyros presently available in the commercial market. Such gyroscopes have been described in the literature (e.g., see Nakamura, "Piezoelectric Free-Free-Bar Vibration Gyroscope"). The exemplary embodiment of this invention uses the GYROSTAR™ Piezoelectric Vibrating Gyroscope ENX-0011 available from Murata Mfg. Co. Ltd.

Relatively economic accelerometers are also known in the art and commercially available. For example, the exemplary embodiment of this invention utilizes a capacitive accelerometer Model 1010 available from Silicon Designs, Inc.

It is also generally known in the aircraft industry that when an aircraft in flight undergoes a coordinated banked turn, the aircraft experiences an increased gravity or G-force along its vertical axis related to the bank angle θ by the following equation:

$$G_{force} = 1/(\cosine\ \theta) \qquad \text{Equation (1)}$$

BRIEF SUMMARY OF THE INVENTION

A simple, single axis rate gyro can be conveniently used to measure the turn rate of a vehicle in an extremely simple and stable arrangement where the vehicle remains stable on an exactly level and flat surface and the rate gyro axis is positioned to sense the vehicular turn rate. Any change in the heading or direction of such a vehicle could be measured by simply integrating the output of the rate gyro transducer.

However, this simple relationship does not apply when a vehicle such as an aircraft in flight banks while turning. (Nor does it apply when a vehicle such as an aircraft is subject to turbulence-induced acceleration forces—unless integrated over a sufficient time constant to average out the turbulence-induced effects.) In this case, the single axis of the simple rate gyro is also banked and thus the effective turn or yaw rate output of the gyro is diminished by the cosine of the bank angle θ (as compared to the actual true turn rate of the aircraft). For example, if the aircraft is undergoing a 45° banked turn, the apparent turn rate reported by a simple one-dimensional rate gyro would be cosine (45°)=0.707 of the actual turn rate:

$$\text{Measured yaw rate} = (\text{turn rate})\ (\cosine\ \theta) \qquad \text{Equation (2)}$$

However, I have now recognized that this expected error in the measured yaw rate of simple one-dimensional rate gyro may be very simply and economically corrected by utilizing a simple one-dimensional accelerometer to, in effect, measure the aircraft bank angle in accordance with the known Equation (1) set forth above. In particular, the actual turn rate of a banked aircraft may be obtained by integrating the product of the apparent gravity force measured by the accelerometer with the yaw rate measured by the rate gyro (the product effectively causing the cosine θ factor included in both the rate gyro and accelerometer outputs to undergo self-cancellation).

Although this simple bank angle compensation of a rate gyro output may be obtained in numerous ways (in either analog or digital or hybrid A/D or D/A embodiments), the presently preferred exemplary embodiment utilizes a programmed digital signal processor (e.g., a one-chip microprocessor unit) to perform some of the signal processing functions.

I have also discovered a "clamp and integrate" technique for deriving an error correction to the yaw-rate transducer output—even for applications where it may not need to be corrected for bank angle correction.

In the exemplary embodiment, the effective precision of the measured turn rate is further enhanced by utilizing a substantially continuously operating integrator in a current balance measurement circuit. In particular, the output of the yaw rate gyro is measured by having the digital signal processor control a reference current source input to a current balance (the output of the current balance being monitored by the digital signal processor). In the preferred exemplary embodiment, the integrator in the current balance circuit is never reset (or at least is only reset after relatively long elapsed time periods). Accordingly, any "remainder" analog current from one signal processor sampling period to the next remains in the integrator and continues to accumulate (in either a positive or negative direction) such that, if it continues to accumulate, it will eventually contribute appropriately to the measured turn rate. In this way, the effective precision of the turn rate measurement continues to increase as elapsed time from circuit initialization increases.

As briefly alluded to above, another potential problem with the use of simple one-dimensional rate gyros for determining vehicle heading in real life environments is turbulence-induced outputs from the rate gyro. For example, at a 15 Hz sampling rate, the turbulence-induced output of the rate gyro housed in an aircraft may be extremely large compared to the actual aircraft turn rate. To greatly reduce the influence of such turbulence-induced errors, the exemplary embodiment of this invention not only integrates the rate signal to determine the accumulated turn, it also integrates a clipped (i.e., amplitude limited) version of the rate signal to derive an error-compensation signal. As referred to above, this may aptly be referred to as a "clamp and integrate" technique for deriving a directional error correction signal.

To derive this error signal, the dynamic range of periodic rate gyro measurements used for error correction is purposely limited. For example, in the preferred exemplary embodiment, the dynamic range of periodic turn rate updates (e.g., 15 times per second) is limited severely to only plus one, zero or minus one. The clipped or limited signal is integrated to provide an error term that is largely (a) the gyro offset and drift and (b) the measurement system offset and drift. The error signal is subtracted from the turn rate to prevent the accumulation of error as a drift in heading. Accordingly, even if there happens to be a very large turbulence-induced output (e.g., corresponding to perhaps plus 200 or minus 200), its influence on the heading output will be very much reduced. As the same time, since expected signal changes (e.g., aircraft heading changes) are expected to occur much more gradually, such severe dynamic range limitations will not have much if any effect on the desired signal output.

Such dynamic range limitations in the derivation of an error signal therefore increase the rate of signal convergence to the desired output (e.g., aircraft heading change) signal and offset expected errors.

Yet another problem with relatively inexpensive one dimensional rate gyros is the possibility of significant offset errors in their output. In the exemplary embodiment of this invention, a first relatively aggressive rapid offset error measurement and correction routine is utilized initially (e.g., for the first five or ten seconds after aircraft electrical power is first turned on and the aircraft can be assumed to be at rest). Thereafter, a relatively slower less aggressive offset error measurement and correction routine is utilized.

BRIEF DESCRIPTION OF THE DRAWINGS

These, as well as other objects and advantages of this invention, will be more completely understood and appreciated by careful study of the following more detailed description of a presently preferred exemplary embodiment of the invention taken in conjunction with the accompanying drawings, of which:

FIG. 1 is a general block diagram of a presently preferred exemplary embodiment of this invention;

FIGS. 2A and 2B are diagrammatic depictions of an aircraft undergoing a banked turn in flight so as to illustrate the turn angle $\alpha$, the turn rate which is the first order time derivative of $\alpha$ and the bank angle $\theta$ as well as the apparent gravity force $G_{force}$ acting along the banked yaw axis of the aircraft;

FIGS. 4–6 are flow charts of suitable program subroutines for use with the digital signal processor of FIG. 3 in the exemplary embodiment of this invention.

DETAILED DESCRIPTION OF AN EXEMPLARY EMBODIMENT

Figure 3:
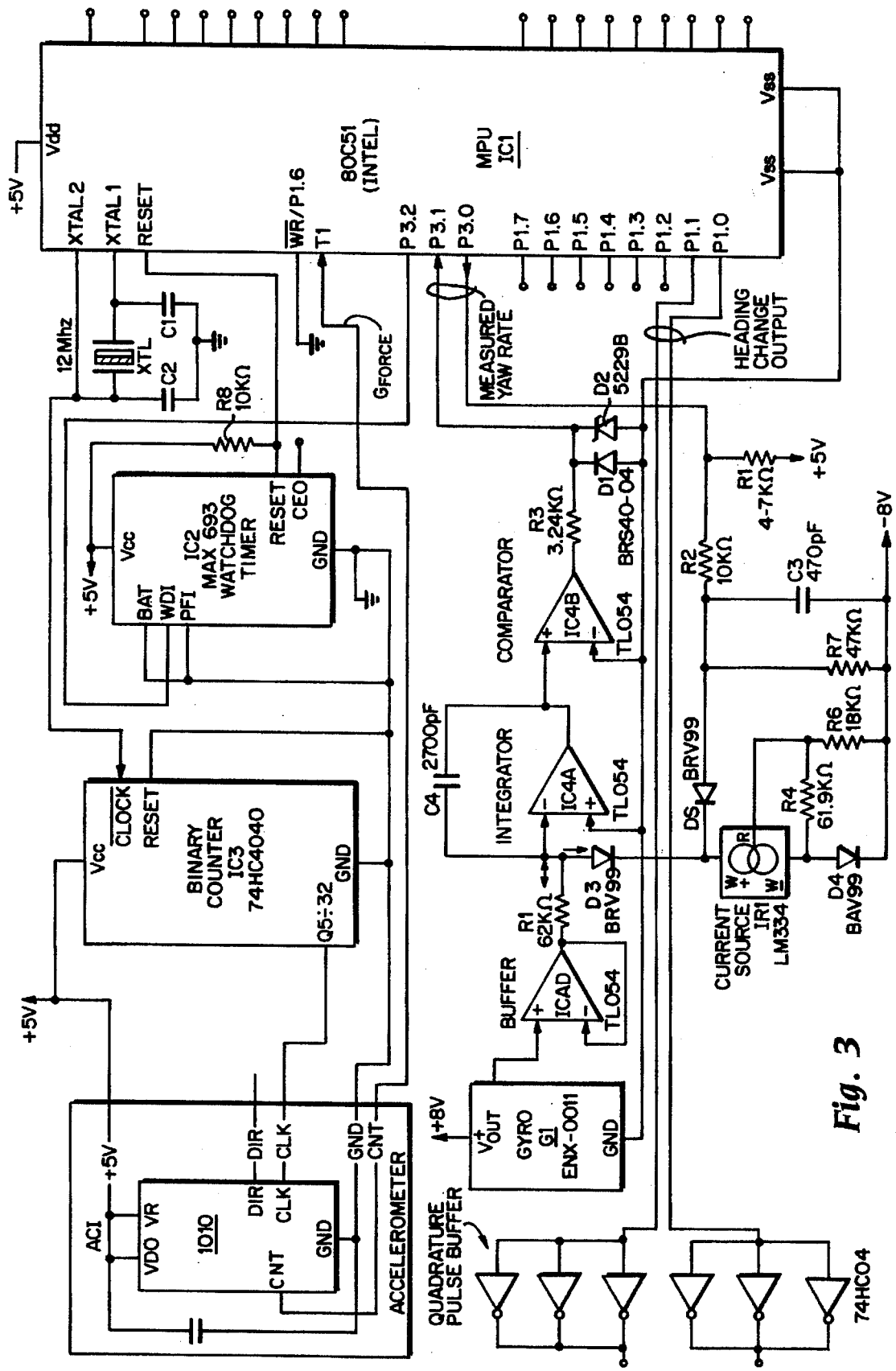
FIG. 3 is a block diagram of the hardware utilized in the exemplary embodiment of FIG. 1.

As depicted in FIG. 1, the exemplary embodiment of this invention utilizes a simple one-dimensional yaw rate transducer 10 as the rate gyro providing an output signal proportional to the product of the aircraft turn rate and the cosine of the bank angle. As schematically indicated in FIG. 1, a portion of the yaw rate transducer is implemented via digital signal processing in a programmed digital signal processor 12.

The exemplary embodiment of FIG. 1 also includes a simple one-dimensional accelerometer 14 as an effective bank angle transducer (since the measured apparent gravity force acting through the vertical yaw axis of the banked aircraft is inversely proportional to the cosine of the bank angle). Once again, in the exemplary embodiment, a portion of the accelerometer/bank angle transducer 14 is implemented within programmed digital signal processor 12.

Within that same programmed digital signal processor 12, the programmed CPU (and related on-board memory, I/O and other circuits) constitute signal processing circuits 16 that effectively combine the output of transducers 10 and 14 so as to provide a signal proportional to the actual aircraft turn rate (i.e., compensated for the bank angle $\theta$). Thereafter, the programmed digital signal processor 12 also provides an integrator 18 (e.g., by periodically updating an accumulating register) so as ultimately to provide an output proportional to the aircraft heading changes (i.e., representative of angular changes in heading).

In the exemplary embodiment, such aircraft heading changes are provided as a pair of quadrature-phase step motor drive signals (e.g., because a commonly available horizontal situation indicator, the King KCS55, and a popular lightning detector, the StrikeFinder™, by Insight Instrument Corporation of Erie, Ontario, Canada both use that type of heading change signal input protocol). However, as those in the art will appreciate, the aircraft heading change output signal can be provided in any convenient format to interface with any desired aircraft navigation, weather indicating or other cockpit devices requiring relative aircraft heading information as an input. Absolute heading data can, of course, also be accumulated from the heading change data if a predetermined heading index (e.g., magnetic or true North) is available or provided.

FIG. 2A is a schematic plan view of an aircraft just about to enter a banked turn where a heading change from 045 degrees (North East) to 135 degrees (South East) is schematically indicated. FIG. 2B depicts a cross-sectional elevation view of the aircraft after it has banked during the turn and illustrating the bank angle $\theta$ with a superimposed right triangle showing the relationship between apparent measured gravity force $G_{force}$ measured by one-dimensional accelerometer and the bank angle $\theta$ of the banked yaw axis of the aircraft.

As shown in more detail at FIG. 3, the exemplary embodiment uses a programmed microprocessor IC1 to measure the yaw rate signal, to measure the apparent gravity $G_{force}$ acceleration signal, to correct the errors in these signals and, finally, to generate the desired heading or heading change output signal. In this example, the exemplary rate gyro G1 (e.g., the GYROSTAR™ ENX-0011) produces a bipolar voltage for clockwise/counterclockwise turning rates. The signal scale factor is about 22 mV per degree per second with a full scale output limit of about 90° per second. Accordingly, at typical "normal" general aircraft turn rates, the useful turn rate signal component is relatively small, constituting but a small fraction of the full scale transducer output. This means that the transducer offset error and offset drift will appear to be relatively large in magnitude compared with the desired useful signal output component of the transducer.

Because the turn rate (i.e., the first order derivative of the turn angle with respect to time) must be integrated so as to derive the desired heading or "turn" information, any transducer offset error in the measured turn rate will continuously accumulate as an increasingly erroneous output heading signal. Accordingly, some provision is needed to cause the effective integrated offset error to be continuously compensated toward zero. For example, even if the aircraft is perfectly stationary, any offset error in the measured turn rate will accumulate in the integrated heading output signal and cause it to appear that the aircraft is undergoing a turn when it is not.

One approach to compensate such offset errors is to measure the effective long term offset constant by merely measuring the long term average of the transducer output and subtracting. This theory is based on an assumption that any actual aircraft turns would ultimately average to zero as well. In addition to this potential practical flaw in the theory, turbulence-induced errors also typically cause a very large dynamic range of measured yaw rates from the transducer. Such turbulence-induced yaw-rate measurement errors may sway the average output (at least momentarily) over a very wide range—or require unduly long averaging periods to derive the desired offset error correction factor.

However, I have discovered that a purposeful limitation of dynamic range may be utilized to greatly reduce the significance of at least the turbulence-induced errors. In particular, instead of deriving an offset error compensation factor by merely taking a long term average of the yaw output signal, a long term average of a limited or clamped dynamic range output is utilized.

For example, if the measured yaw rate signal is in digital form and each signal sample comprises ten bits, then there is a potential dynamic range of zero to 1,023 signal values during each sampling period. The turbulence-induced error component in such measured yaw rate may easily occupy as much as 100–200 or so measurement levels within such dynamic range (i.e., on the order of 20% of the available dynamic range). The true transducer offset error component (which must be measured and eliminated) may be on the order of only five to ten measurement levels (e.g., 0.5%–1% of the total dynamic range per sampling). However, by severely clamping or limiting the dynamic range of yaw rate measurements which contribute to the final output, the influence of the potential turbulence-induced errors can be greatly reduced in comparison to those of the offset-errors that one is trying to measure and compensate. Although various degrees of dynamic range limitation may be employed, the present exemplary embodiment limits the dynamic range to as little as minus one, zero and plus one in the context of a 10 bit digital signal having a dynamic range of 0–1023.

Under such conditions, the influence of a yaw rate signal providing up to 200 counts per sampling variation from turbulence-induced error is reduced to only 0.5% of its original value—while the influence of a one count per sampling period actual yaw rate measurement retains its full weight. Accordingly, such a severe limitation on the dynamic range of signals used to derive the long term average for offset error correction actually causes a much more rapid convergence toward the correct offset error value. As may be appreciated, any limitation in the dynamic range below the dynamic range of expected turbulence-induced yaw rate signals (which in the exemplary system may be as high as approximately 20% of the available dynamic range) will tend to selectively reduce the influence of turbulence-induced errors in the critical offset error correction process. While larger but still limited dynamic ranges may well be useful for some applications, when the limit is reduced to minus one, zero and plus one as in the exemplary embodiment, it is basically equivalent to the limited derivative of the signal. In other words, when the dynamic range of a signal has been clipped to ±1 most (nearly all) of its linear value is gone. About all that is left is the direction of the signal. This is, of course, analogous to the sign of a derivative. The measuring signal rate is a rate which implies a derivative. Clamping the dynamic range of the signal is analogous to clamping the derivative. Some implementations may be better served by a clamped derivative.

Practical implementations of rate gyro heading sources typically require more than just a simple analog-to-digital measurement system. In particular, for the error correction loop to work well and for the turn measurement output to work well, the measurements are preferably performed in a rapidly sampled, effectively continuous, fashion. In the exemplary embodiment, the rate gyro transducer subsystem includes an integrating current balance which provides an important first level of signal averaging that itself will tend to reduce turbulence-errors. Since the current balance integrator is not reset to zero at the conclusion of each sample measurement cycle, any left over analog signal "remainder" (of either polarity) will continue to influence subsequent measurement cycles (and will continue to accumulate if the remainder in fact continues to occur during successive sample periods).

Although it is possible that the integrator might be reset from time to time, the preferred exemplary embodiment simply lets the system run continuously after turn-on without interruption thus effectively continually increasing the effective precision of the current balance measurement of yaw rate gyro rate transducer signals. In such an implementation, even though only 10 bit digital signals are utilized (i.e., having a maximum of 1,024 possible values), the analog current balance integrator continues to react to whatever "remainder" happens to be left in the integrator during each sample period and thus acts to extend the effective overall precision of the measurement process indefinitely to provide effectively unlimited precision in this context.

As mentioned earlier, the offset error of the rate gyro must somehow continuously be measured and compensated for so as to effectively reduce it toward zero. In particular, even though the yaw rate measurement is eventually converted to 10 bit digital sample signals, the measured offset error to be used in compensating the yaw rate signal measurement is derived from the "clamped integration" technique described above and is preferably of much greater effective precision that even one least significant bit of the 10 bit yaw rate transducer signal. In the exemplary embodiment, the effective precision of the "clamped integration" offset error compensation may actually be hundreds of times better than the single least significant bit precision of the measurement signal being compensated. Such enhanced precision may actually be required to reduce round-off errors that would otherwise accumulate when the measured offset error compensation value is subtracted from each periodic digital sample signal of the yaw rate measurement.

In the exemplary embodiment, the precision of the offset error measurement grows with continuous integration and is therefore maintained in an integer plus fraction digital form. Of course, the integration value of the rate signal itself is also maintained in the same compatible high precision format at this point in the system so as to maintain the desired high level of precision when the error fraction is subtracted during the error compensation routine. For example, if 32 bits are devoted to each sample point digital signal (for both the measured offset compensation error and the transducer yaw rate signal), then the 24 most significant bits of such a 32 bit quantity may be conveniently used as the integer while the 8 least significant bits would be considered the fraction (e.g., the binary point is assumed to be placed just after the 24 most significant bits of the 32 bit digital signal).

The accelerometer transducer used in the exemplary embodiment happens to contain its own measurement subsystem. The actual analog accelerometer transducer signal inside the subsystem is represented by a percentage of the drive clock pulse signals input to the subsystem. For example, zero measured gravity force may be represented by an output signal rate that is 50% of the input drive clock signal rate. A positive one Gravity force may be represented by an output pulse rate equal to 55% of the input drive clock pulse rate while a measured Gravity force of minus one may be represented by an output pulse rate equal to 45% of the input drive clock pulse rate. In the exemplary embodiment, a microprocessor timer function is used to count the accelerometer output clock pulses and thus to internally derive a digital signal representing the effective measured gravity force along the one-dimensional axis of the accelerometer (i.e., aligned with the banked yaw axis of the aircraft). This accelerometer responds in frequencies down to DC.

The programmed digital signal processor 12 in the exemplary embodiment measures the turn rate at a 50 Hz periodic sampling rate (e.g., the turn rate signal is updated every 0.02 seconds). A calculated offset error is subtracted from the yaw rate signal (using fractional LSB precision as noted above). The result is multiplied by the measured accelerometer $G_{force}$ signal and the result is integrated to provide a heading measurement. Assuming a scale factor of one heading degree equal to ten input "counts," then whenever the integration exceeds ten "counts," ten is subtracted from the accumulating integrated result and one degree is added to an output heading register. Of course, a negative ten "counts" would be interpreted as a turn in the opposite direction such that minus one would in that case be added to the heading register.

Once the error compensated heading measurement is derived and available as a digital signal (e.g., as the content of a hardware or software digital signal register within the digital signal processor), it is available for use in providing a heading output signal in any desired signal format. The preferred exemplary embodiment is intended to be used to synchronize the display of a StrikeFinder™ lightning detector when the aircraft turns. In other words, the detected lightning strikes being displayed on the StrikeFinder™ display screen can thus be reoriented to always be in the correct relative position with respect to the instantaneous aircraft heading for convenient pilot interpretation.

In this particular case, the most convenient way to convey the heading information is via the usual quadrature signal pair commonly used to drive stepper motors (with the phase leading/lagging relationship of the two signals in the signal pair defining either clockwise or counterclockwise rotation of the step motor). If a mechanical heading indication is desired, then such output may also be used to directly drive a stepper motor which controls an aircraft heading indicator or the like. Alternatively, numeric or digital heading displays could be easily driven by the available digital heading signal in the digital heading process so as to provide a digital heading read-out. For yet other aircraft applications, a well known "synchro-selsyn" (or simply "synchro") signal format may be used as will be appreciated by those in the art.

FIG. 3 depicts a schematic diagram of the exemplary embodiment hardware. It may conveniently be physically incorporated in a heading adapter plug-on auxiliary device for the StrikeFinder™. As such, it may be configured for simple installation on all StrikeFinder™ instruments such that installation merely requires unplugging the existing interface connector on the back of the instrument, plugging on the adapter of FIG. 3 instead (with suitable pin connections of course) and then plugging in the interface connector onto the back of the adapter. The adapter may be made to be the same height and width of the StrikeFinder™ instruments so as to add only about 0.75 inches to its depth.

The circuit depicted in FIG. 3 includes the rate gyro G1 powered by plus eight volts and supplies its rate output as a voltage referenced 2.5 volts above the ground potential. That is, a zero turn rate would be indicated by plus 2.5 volts. Positive turn rates would be indicated by voltages higher than 2.5 volts while negative turn rates would be indicated by voltages less than 2.5 volts.

The yaw turn rate signal from gyro G1 is first buffered by operational amplifier IC4D and then connected as one input to a charge balance/analog-digital converter including the analog integrator IC4A, comparator IC4B, current source IR1 and the controlling program digital signal processor IC1. The output of the comparator is connected to port 3.1 of IC1 where it is monitored under program control which, in response, provides an output at port P3.0 to turn the current source IR1 on or off via diode switch D3, D5. The IC1 signal processor is programmed so as to watch the output of comparator IC4B and to control the current source IR1 in a constant ongoing attempt to maintain a zero average charge on the integrator capacitor C4.

The rate gyro G1 output signal provides a positive current input to the integrator while the current source IR1 provides a negative current (i.e., these two input currents are oppositely directed at the input node of integrator IC4A). The programmed IC1 keeps track of the percentage of time that it is required to keep the current source IR1 turned "on" in its ongoing effort to maintain a balance with the input signal from the rate gyro. Accordingly, the duty cycle of the current source IR1 is a measure of the rate gyro signal magnitude input to the current balance. For example, if the current source IR1 supplies a constant 100 microamperes when turned "on" and if during a given sampling period it is assumed to have a 20% duty cycle (as determined by the efforts of IC1 trying to maintain a balance in the integrator IC4A), then the input current from the rate gyro G1 to the current balance can be deduced as having been 20 microamperes during that sampling period.

The exemplary use of a current balance for measuring the output of the rate gyro G1 has many advantages. First of all, any analog "remainder" signal left on the integrator capacitor C4 at the end of a given sampling period by the programmed processor IC1 can merely be left in place so as to influence the next succeeding cycle of current balance measurement. This sort of ongoing accumulation of any analog "remainder" with a continuously running current balance provides for essentially unlimited precision since every increment of current output from the rate gyro G1 continues to influence overall ongoing subsequent measurement.

In addition, the integrator IC4A input stage also serves as a first level for averaging of high rate (i.e., large dynamic range) signals such as those expected from turbulence-induced outputs of the rate gyro G1. Assuming that the current source IR1 and the series input resistor R1 are precisely and accurately determined parameters of the system, then other component variations have relatively reduced effects on accuracy. It is also a particularly simple and low cost implementation utilizing a charge balance converter sub-system that is itself well known and proven technology.

The accelerometer Model 1010 is somewhat unusual in that, instead of an analog output, it includes its own charge balance converter thus providing a digital signal interface. In particular, an input clock signal in the range of 100 kHz to 1 MHz is provided (in this case from the 12 MHz crystal clock that also drives the program digital signal processor IC1 via the divide by 32 binary counter IC3 shown in FIG. 3 to provide a nominal 375 KHz input clock). The output clock rate from the accelerometer 1010 is connected to the timer T1 input of the programmed IC1 thus enabling it, under suitable program control, to count the number of output pulses (e.g., with an internal 16 bit count timer) over a given interval. A suitable time-driven interrupt routine within IC1 periodically samples and clears the timer register T1 which count the accelerometer output clock pulses over a predetermined interval thus determining the output clock rate and thus the effective G force acting along the accelerometer axis (e.g., the aircraft yaw axis). As previously indicated, if the output clock signals from the accelerometer are 50% of the input clock signals, then a zero gravity force along the one dimensional axis of the accelerometer is indicated. However, if the counted clock pulses equal 55% of the input clock rate, then a positive 1 G force is indicated, and so on. A suitable non-maskable interrupt counter/timer routine for the IC1 should thus be easily configured by those in the art.

The circuitry of FIG. 3 is preferably powered from a plus 8, minus 8 volt power source available at the StrikeFinder™ connector. The plus 8 volt supply is in preferably regulated to plus 5 volts (by suitable conventional voltage regulator circuits not shown) for use by the circuits shown in FIG. 3. IC2 is a conventional watch dog timer which controls the IC1 power on reset functions as well as acting to reset the chip appropriately upon power interruptions. In addition, the watch dog timer is connected to output pin 3.2 of the ICU which has been programmed to provide suitable signal variation thereat during normal programmed operation. If the watch dog circuit ICU detects a lack of such activity, then it may also initiate a reset of the MPU. In this way, most if not all operational glitches may be trapped and the MPU automatically restarted as necessary.

As shown, the IC1 is programmed to provide phase quadrature outputs at output port pins P1.0 and P1.1. These heading change outputs may be buffered, if necessary, by conventional buffer circuits 74HC04 as depicted in FIG. 3 before being connected at the ultimate output pins to convey heading signals to the instrument of choice (e.g., a StrikeFinder™ storm monitoring system).

Although the exemplary system may still have some limitations for some applications (e.g., it may not have the accuracy of a magnetic compass or long term stability of some high priced conventional compass systems and may also be subject to errors caused by uncoordinated turns or acceleration during pitch changes of the aircraft), it is still a sufficiently accurate and economic source of heading information as to find substantial utility. Of course, as earlier mentioned, if the exemplary system is to be used to provide an absolute navigation heading (e.g., with respect to magnetic or true North), it would have to be periodically corrected by a magnetic heading reference (e.g., a magnetic flux gate compass as are conventionally used to correct slaved gyro compasses and horizontal situation indicators in aircraft).

FIGS. 4–6 depict in flow chart form a program suitable for use with IC1 in FIG. 3. The main measurement process subroutines are depicted at FIGS. 4–6. It will be understood that a higher level executive program would be included to take care of initialization and other "house-keeping" tasks. That executive program or its equivalent in timed interrupts periodically calls and executes the subroutines depicted in FIGS. 4–6.

For example, at box 400 in FIG. 4, the output of accelerometer 1010 is measured in a "measure acceleration" subroutine that is called at about a 15 Hz rate. A conventionally derived offset term is subtracted at 402 (and otherwise scaled if necessary) while the product of the corrected acceleration measurement and a corrected yaw-rate measurement is produced at 404. Such a product is then integrated at 406 to provide an updated relative heading signal value.

The error-compensated yaw-rate signal is periodically produced by the "measure yaw-rate" subroutine (e.g., also called at about a 15 Hz rate) of FIG. 5. The yaw-rate from the current balance circuit is measured at 408 and then the derived yaw-rate error term is subtracted at 410. The error term is itself calculated on the first pass (i.e., at turn on) by following path 418 and simply setting the error term to equal the measured yaw-rate output. This means that, at turn on time when the vehicle is assumed to be at rest, the corrected yaw-rate is zero—as it should be. Thereafter, as the elapsed time from turn on increases, the degree of clamping imposed at 412 on the dynamic range of the error-term inputs is decreased from an agressive level (e.g., clipping at 10% or 20% of maximum scale) to a minimum level (e.g., ±one unit—or about 0.05% in the exemplary embodiment) over a 10–15 second time period. The clamped (i.e., clipped) dynamic range of the current error-compensated yaw-rate signal from box 412 is integrated at 414 so as to derive an updated error term.

As depicted in FIG. 6, the usual stationary heading "quadrature output" subroutine is entered (e.g., at a 100 Hz rate) at 500. Repetitive tests are conducted at 502 and 504 to see if a relative heading (as produced at box 406 in FIG. 4) has now increased by more than 1 degree or decreased by more than 1 degree. If so, then the quadrature output registers are incremented in either the clockwise or counterclockwise step directions respectively at boxes 506 and 508 (and a unit value is either subtracted from a heading register or added to the heading register respectively). Although the heading measurement is updated at 406 to a higher level of apparent precision (e.g., 0.1 degree increments), the higher increments required before actually changing the output provides useful hysteresis to mask smaller spurious excursions in the intermediate heading measurement results.

While the invention has been described in connection with what is presently considered to be the most practical and preferred embodiment, those in the art will understand that this embodiment may be modified in many ways while yet retaining some or all of the novel advantages and benefits of this invention. Accordingly, all such modifications and equivalent arrangements are intended to be included within the scope of the appended claims.

What is claimed is:

1. An error-corrected rate gyro apparatus comprising:

a rate gyro providing an output that is compensated for error by subtraction of an error signal; and an error signal generation circuit including (a) an amplitude clamp connected to receive the error-compensated rate gyro output and to provide an amplitude-clamped output and (b) an integrator connected to receive and integrate said amplitude-clamped output to provide an updated value for said error signal.

2. An error-corrected rate gyro apparatus as in claim 1 installed as a yaw-rate gyro in a vehicle for measuring heading changes of a banked and turning vehicle, said apparatus further comprising:

a bank angle transducer providing a bank angle signal; and a signal combining circuit connected to receive, process and combine the error-corrected output of the yaw-rate gyro with the bank angle signal thereby providing a vehicle heading output signal representative of vehicle heading changes.

3. Rate gyro heading apparatus to be installed in a vehicle for measuring heading changes of a banked and turning vehicle, said apparatus comprising:

a yaw rate transducer;

a bank angle transducer; and a signal combining circuit connected to receive, process and combine outputs from both of said transducers thereby providing an vehicle heading output signal representative of vehicle heading changes.

4. Rate gyro heading apparatus as in claim 3 wherein said bank angle transducer comprises an accelerometer.

5. Rate gyro heading apparatus as in claim 3 wherein said signal combining circuit comprises a programmed digital signal processor.

6. Rate gyro heading apparatus as in claim 5 wherein part of said yaw rate transducer is included as part of said programmed digital signal processor.

7. Rate gyro heading apparatus to be installed in a vehicle for measuring heading changes of a banked and turning vehicle, said apparatus comprising:

a yaw rate transducer;

a bank angle transducer;

a signal combining circuit connected to receive, process and combine outputs from both of said transducers thereby providing a vehicle heading output signal representative of vehicle heading changes, wherein said yaw rate transducer comprises:

a yaw rate gyro; and a substantially continuously operating current balance circuit connected to an output of the yaw rate gyro and to a reference current source.

8. Rate gyro heading apparatus to be installed in a vehicle for measuring heading changes of a banked and turning vehicle, said apparatus comprising:

a yaw rate transducer;

a bank angle transducer;

a signal combining circuit connected to receive, process and combine outputs from both of said transducers thereby providing a vehicle heading output signal representative of vehicle heading changes, wherein said signal combining circuit comprises a programmed digital signal processor; and wherein said programmed digital signal processor generates a pair of quadrature-phase step motor drive signals.

9. Rate gyro heading apparatus to be installed in a vehicle for measuring heading changes of a banked and turning vehicle, said apparatus comprising:

a yaw rate transducer;

a bank angle transducer;

a signal combining circuit connected to receive, process and combine outputs from both of said transducers thereby providing a vehicle heading output signal representative of vehicle heading changes, and a dynamic range signal limiter connected to limit the dynamic range of periodic changes made to a yaw-rate error signal based on a long term average of the raw yaw-rate measurement thereby reducing the significance of turbulence-related noise components affecting the heading output signal.

10. Rate gyro heading apparatus to be installed in a vehicle for measuring heading changes of a turning vehicle, said apparatus comprising:

a turn rate transducer having an output with a vehicle turn rate component related to vehicle turn rate but also including a noise component that is typically larger in magnitude than the vehicle turn rate component; and a dynamic range signal limiter connected to receive and process said transducer output to produce a yaw-rate error-compensation signal.

11. Rate gyro heading apparatus as in claim 10 wherein:

said turn rate transducer includes digital signal processing circuits providing said transducer output as a periodically recurring digital signal, and said dynamic range signal limiter includes digital signal processing circuits which process said transducer output by limiting each of its periodic occurrences used for deriving the error-compensation signal to a dynamic range that initially decreases from a higher value to a value of less than plus or minus 1%.

12. Rate gyro heading apparatus as in claim 10 wherein:

said turn rate transducer includes digital signal processing circuits providing said transducer output as a periodically recurring digital signal, and said dynamic range signal limiter includes digital signal processing circuits which process said transducer output by limiting each of its periodic occurrences used for deriving the error-compensation signal to a dynamic range of plus one unit increment, zero or minus one unit increment.

13. Rate gyro heading apparatus as in claim 10 wherein said turn rate transducer includes a substantially continuously operating current balance measuring circuit.

14. Rate gyro heading apparatus as in claim 10 including a transducer offset error compensator that operates at times in a first relatively fast aggressive mode and at other times in a second relatively slower mode.

15. Rate gyro heading apparatus as in claim 10 further comprising a vehicle bank angle transducer connected to compensate the turn rate transducer output for errors related to vehicle bank angle.

16. Rate gyro heading apparatus as in claim 15 wherein said bank angle transducer includes an accelerometer.

17. Apparatus to be installed in a vehicle for measuring heading changes of a banked and turning a vehicle, said apparatus comprising:

a one-dimensional accelerometer aligned with the vehicle yaw axis;

a one-dimensional rate gyro aligned with the vehicle yaw axis; and a multiplication and integration circuit connected to receive the outputs of said accelerometer and said gyro and to integrate the product thereof.

18. Apparatus as in claim 17 wherein said multiplication and integration circuit comprises a programmed digital signal processor.

19. Apparatus to be installed in a vehicle for measuring heading changes of a banked and turning vehicle, said apparatus comprising:

a yaw rate transducer which provides a measured vehicle yaw-rate signal related jointly to vehicle turn rate and bank angle;

a bank angle transducer which provides a measured bank angle signal related to vehicle bank angle; and signal processing circuits connected to receive said yaw rate signal and said bank angle signal and to provide a vehicle heading output signal representative of vehicle heading changes.

20. Apparatus as in claim 19 wherein said bank angle transducer comprises an accelerometer which measures the apparent gravity force acting on the vehicle parallel to its yaw axis and thus inversely proportional to the cosine of the vehicle bank angle.

21. Apparatus as in claim 20 wherein said yaw rate signal is proportional to the vehicle turn rate multiplied by the cosine of the vehicle bank angle.

22. Apparatus as in claim 21 wherein said signal processing circuits multiply said yaw rate signal by the measured apparent gravity force.

23. Apparatus as in claim 19 wherein said yaw rate signal is proportional to the vehicle turn rate multiplied by the cosine of the vehicle bank angle.

24. Apparatus as in claim 23 wherein said signal processing circuits multiply said yaw rate signal by the measured apparent gravity force.

25. Apparatus to be installed in a vehicle for measuring heading changes of a banked and turning vehicle, said apparatus comprising:

a yaw rate transducer which provides a measured vehicle yaw-rate signal related jointly to vehicle turn rate and bank angle;

a bank angle transducer which provides a measured bank angle signal related to vehicle bank angle;

signal processing circuits connected to receive said yaw rate signal and said bank angle signal and to provide a vehicle heading output signal representative of vehicle heading changes, and wherein said yaw rate transducer comprises:
a yaw rate gyro having an analog output signal;
a reference current source providing a reference current signal; and
a current balance circuit having one input connected to receive said analog output signal and another input connected to receive said reference current signal.

26. Apparatus as in claim 25 wherein said current balance circuit comprises:

a current summing node connected to said inputs;

an integrator connected to said current summing node and providing an integrated sum signal;

a comparator connected to compare said integrated sum signal to a predetermined reference signal and to produce a comparator output relating said integrated sum signal to said predetermined reference signal; and a programmed signal processor connected to receive said comparator output and to control the effective magnitude of said reference current signal so as to balance the analog output of the yaw rate gyro over time and thereby derive a digital yaw rate signal.

27. Apparatus as in claim 26 wherein said programmed signal processor controls the reference current source by turning it on and off and derives a digital signal proportional to the duty cycle of the reference current source that is required to balance the analog output signal of the yaw rate gyro.

28. Apparatus as in claim 27 wherein said current balance operates continuously without being reset to zero over substantial time periods such that the overall precision of the yaw rate measurement of the current balance increases with increasing elapsed time.

29. Apparatus as in claim 25, 26 or 27 or wherein said current balance operates continuously without being reset to zero over substantial time periods such that the overall precision of the yaw rate measurement of the current balance increases with increasing elapsed time.

30. Apparatus as in claim 26 wherein said current balance operates continuously without being reset to zero over substantial time periods such that the overall precision of the yaw rate measurement of the current balance increases with increasing elapsed time.

31. Apparatus to be installed in a vehicle for measuring heading changes of a banked and turning vehicle, said apparatus comprising:

a yaw rate transducer which provides a measured vehicle yaw-rate signal related jointly to vehicle turn rate and bank angle;

a bank angle transducer which provides a measured bank angle signal related to vehicle bank angle;

signal processing circuits connected to receive said yaw rate signal and said bank angle signal and to provide a vehicle heading output signal representative of vehicle heading changes, and wherein said signal processing circuits periodically accumulate signals representing changes in vehicle yaw-rate that have been limited in dynamic range to generate an error-compensation signal that is subtracted from the measured yaw-rate to improve the signal-to-noise ratio in the vehicle heading output signal while also increasing its rate of correction for any offset error in the yaw rate signal from the yaw rate transducer.

32. Apparatus as in claim 31 wherein said periodically accumulated signals are digital signals that have been limited to a dynamic range of less than plus or minus 10%.

33. Apparatus as in claim 31 wherein said periodically accumulated signals are digital signals that have been limited to a dynamic range that at least once decreases from a value higher than about 10% to a value lower than about 1%.

34. Apparatus as in claim 31 wherein said periodically accumulated signals are digital signals that have been limited to a dynamic range of less than 0.1%.

35. Apparatus as in claim 31 wherein said periodically accumulated signals are digital signals that have been limited to a dynamic range of plus or minus one unit increments.

36. Apparatus to be installed in a vehicle for measuring heading changes of a banked and turning vehicle, said apparatus comprising:

a yaw rate transducer which provides a measured vehicle yaw-rate signal related jointly to vehicle turn rate and bank angle;

a bank angle transducer which provides a measured bank angle signal related to vehicle bank angle;

signal processing circuits connected to receive said yaw rate signal and said bank angle signal and to provide a vehicle heading output signal representative of vehicle heading changes, and wherein said signal processing circuits, upon being initialized, are conditioned to effect transducer offset error correction using a first clipped dynamic range for an initial time period while the aircraft is assumed to be substantially stationary and thereafter at a second clipped dynamic range which is lower than said first range.

37. A method for error-correcting the output of a rate-gyro, said method comprising the steps of:

using an error signal derived from the rate gyro output to derive an error-corrected rate gyro output;

amplitude clamping the error-corrected rate gyro output; and integrating the clamped signal to provide said error signal.

38. A method as in claim 37 wherein the error signal is initially set to substantially equal the rate gyro output thus initially producing a substantially zero error-corrected rate gyro output.

39. A method as in claim 37 wherein said amplitude clamping step includes changing the degree of clamping as a function of time.

40. A method as in claim 39 wherein said amplitude clamping is reduced from an initially higher value to less than 1% of the available dynamic signal range.

41. A method as in claim 40 wherein said reduction occurs over a time interval of less than 1 minute after the error correction process is initiated.

42. A method for measuring heading changes of a banked and turning vehicle, said method comprising:

measuring yaw-rate of the vehicle with a yaw-rate transducer;

measuring the vehicle bank angle with a one-dimensional accelerometer transducer; and combining outputs from both of said transducers to provide a heading output signal representative of vehicle heading changes.

43. A method as in claim 42 wherein said bank angle measurement is performed using an accelerometer.

44. A method as in claim 42 wherein said yaw rate measurement comprises:

using a yaw rate gyro; and substantially continuously operating a current balance circuit connected to an output of the yaw rate gyro and to a reference current source.

45. A method as in claim 42 wherein combining step is performed within a programmed digital signal processor.

46. A method as in claim 45 wherein part of said yaw rate measurement is performed within said programmed digital signal processor.

47. A method for measuring heading changes of a banked and turning vehicle, said method comprising:

measuring yaw-rate of the vehicle with a yaw-rate transducer;

measuring the vehicle bank angle with a one-dimensional accelerometer transducer;

combining outputs from both of said transducers to provide a heading output signal representative of vehicle heading changes;

wherein combining step is performed within a programmed digital signal processor, and wherein said programmed digital signal processor generates a pair of quadrature-phase step motor drive signals.

48. A method for measuring heading changes of a banked and turning vehicle, said method comprising:

measuring yaw-rate of the vehicle with a yaw-rate transducer;

measuring the vehicle bank angle with a one-dimensional accelerometer transducer;

combining outputs from both of said transducers to provide a heading output signal representative of vehicle heading changes, and limiting the dynamic range of periodic changes made to an error-compensation signal based on an accumulation of measured yaw-rate signals thereby reducing the significance of turbulence-related noise components affecting the heading output signal.

49. A method for measuring heading changes of a turning vehicle, said method comprising:

measuring vehicle turn rate using a transducer having an output with a vehicle turn rate component related to vehicle turn rate but also including a noise component that is typically larger in magnitude than the vehicle turn rate component; and limiting the dynamic range of said transducer output to produce an error-compensation signal.

50. A method as in claim 49 wherein:

said turn rate measurement provides a periodically recurring digital signal, and said dynamic range signal limiting includes limiting each of said periodically recurring digital signals to a dynamic range of less than plus or minus 10 percent.

51. A method as in claim 49 wherein:

said turn rate measurement provides a periodically recurring digital signal, and said dynamic range signal limiting includes limiting each of said periodically recurring digital signals to a dynamic range of plus one, zero or minus one unit increments.

52. A method as in claim 49 wherein said turn rate measurement includes use of a substantially continuously operating current balance measuring circuit.

53. A method as in claim 49 including compensating for transducer offset error at times in a first relatively fast aggressive mode and at other times in a second relatively slower mode.

54. A method as in claim 49 further comprising compensating the turn rate measurement for errors related to vehicle bank angle.

55. A method as in claim 54 wherein said vehicle bank angle compensation includes use of an accelerometer.

56. A method for measuring heading changes of a banked and turning vehicle, said method comprising:

measuring one-dimensional acceleration aligned with the vehicle yaw axis;

measuring one-dimensional yaw-rate aligned with the vehicle yaw axis; and multiplying said measurements and integrating the product thereof.

57. A method as in claim 56 wherein said multiplying and integrating steps utilize a programmed digital signal processor.

58. A method for measuring heading changes of a banked and turning vehicle, said method comprising:

measuring vehicle yaw-rate by deriving signal related jointly to vehicle turn rate and bank angle;

measuring bank angle by deriving a signal related to vehicle bank angle; and combining said measured signals to provide an vehicle heading output signal representative of vehicle heading changes.

* * * * *